(12) United States Patent
Urusova et al.

(10) Patent No.: US 8,733,289 B2
(45) Date of Patent: May 27, 2014

(54) METHOD FOR PREPARING EDIBLE AQUATIC ANIMALS FOR STORAGE

(75) Inventors: Maria E. Urusova, Gatchina (RU); Ilya Y. Ilyin, Brookline, MA (US); James S. Jones, St. Simons Island, GA (US); James Schrum, St. Simons Island, GA (US); John Wadsworth, Brunswick, GA (US)

(73) Assignee: Rich Products Corporation, Buffalo, NY (US)

( * ) Notice: Subject to any disclaimer, the term of this patent is extended or adjusted under 35 U.S.C. 154(b) by 519 days.

(21) Appl. No.: 12/418,776

(22) Filed: Apr. 6, 2009

(65) Prior Publication Data

US 2009/0250010 A1   Oct. 8, 2009

Related U.S. Application Data

(60) Provisional application No. 61/042,967, filed on Apr. 7, 2008.

(51) Int. Cl.
*A01K 61/00* (2006.01)
*A01K 63/04* (2006.01)

(52) U.S. Cl.
USPC ........................................... 119/214

(58) Field of Classification Search
USPC ........................... 119/200, 201, 214
See application file for complete search history.

(56) References Cited

U.S. PATENT DOCUMENTS

| | | | | |
|---|---|---|---|---|
| 4,532,883 A * | 8/1985 | Lockwood et al. | ........... | 119/236 |
| 4,910,039 A * | 3/1990 | Fujita et al. | ................... | 426/652 |
| 5,665,755 A * | 9/1997 | Kurtz et al. | ................... | 514/398 |
| 6,268,353 B1 | 7/2001 | Chaen et al. | | |
| 6,477,982 B1 * | 11/2002 | Ritter | ............................. | 119/231 |
| 6,497,862 B2 | 12/2002 | Oku et al. | | |
| 6,576,281 B1 | 6/2003 | Chaen et al. | | |
| 2003/0091688 A1 * | 5/2003 | Kurzinger | ......................... | 426/2 |
| 2005/0142271 A1 * | 6/2005 | Ojima et al. | ................... | 426/548 |
| 2006/0115881 A1 | 6/2006 | Damude et al. | | |
| 2006/0165840 A1 * | 7/2006 | Breivik et al. | ...................... | 426/2 |
| 2007/0031578 A1 * | 2/2007 | Bjorneset et al. | .............. | 426/643 |
| 2007/0048419 A1 | 3/2007 | Noda et al. | | |
| 2007/0243200 A1 | 10/2007 | Colaco | | |

FOREIGN PATENT DOCUMENTS

JP   2004-129622   *   4/2004

* cited by examiner

*Primary Examiner* — David Parsley
(74) *Attorney, Agent, or Firm* — Fay Sharpe LLP

(57) ABSTRACT

Provided are methods for preparing edible aquatic animals for storage by placing a living aquatic animal into a medium containing trehalose, allowing the live animal to remain in the trehalose solution for a period of time, and removing and processing the animal for storage and/or use for human consumption. The medium may contain a sugar alcohol, such as maltitol. Also, the living aquatic animal may be placed in a medium containing an acid, such as citric acid.

21 Claims, No Drawings

_US 8,733,289 B2_

METHOD FOR PREPARING EDIBLE AQUATIC ANIMALS FOR STORAGE

CROSS-REFERENCE TO RELATED APPLICATIONS

This application claims priority to U.S. Provisional Application No. 61/042,967, filed Apr. 7, 2008, the disclosure of which is incorporated herein by reference.

FIELD OF THE INVENTION

The present invention relates generally to food preservation and more specifically to preservation of edible aquatic animals.

BACKGROUND OF THE INVENTION

A problem associated with storing edible aquatic animals, such as fish and sea products, in a frozen state is the decomposition of trimethylamine-oxide (TMAO) and the formation of volatile trimethylamine (TMA), which is the source of the unpleasant "fish" odor of the product. The main reasons for this odor include destruction of cellular and intracellular membranes during freezing and thawing of the product and subsequent release of enzymes involved in the formation of TMA from TMAO, as well as decomposition of TMAO with subsequent formation of TMA as a result of heating the product.

One known method of preventing the destruction of cellular and intracellular membranes while storing biological materials is to add cryoprotectors, such as different saccharides (monosaccharides, disaccharides, oligosaccharides, polysaccharides, etc.) to the material prior to freezing. For instance, in the method described in U.S. Pat. No. 5,910,331 "Method of freeze-preserving vegetables", vegetables are soaked in a solution that contains polysaccharides and disaccharides. After soaking, the product is quickly frozen. It is believed disaccharides, penetrating the cells of the product during soaking, provide a cryoprotective (freeze-preservation) action during the process of freezing/thawing. Similarly, in the method described in JP 6319501 "Novel frozen food", 0.5-10% (w/w) of disaccharide (trehalose) is added to the product and then the product is frozen. In this case, it is considered the product is protected from damage caused by the freezing/thawing process. However, each of the aforementioned methods have significant disadvantages because the product must be soaked in the saccharides for a long period of time so that there is sufficient penetration of the cells. Since the product is not a live organism when it is treated with the cryoprotectant, autolysis and bacterial putrefaction processes occur, destroying some cells, which, in turn, will adversely affect product quality.

In the method described in U.S. Pat. No. 6,576,281 "Method for inhibiting trimethylamine formation", a fish is first killed and an edible portion of the raw fish food product (for example, fish filets or sea products) is soaked or boiled in a trehalose solution and then cooked. While this method inhibits TMA forming from TMAO in the uncooked fish products, it is used to treat dead animals, which likely creates a higher concentration of trehalose in the meat closer to the product surface, which may alter the taste of the product such that it becomes noticeably and unnaturally sweeter.

The method described in JP 2004129622 "Feed for fish culture", discloses adding 0.1-0.8% w/w of trehalose to fish food. The purpose of the food additive is to accelerate growth and improve the feeding efficiency and survival of fishes and crustaceans. The fish are not intended for human consumption and are therefore not processed for that purpose.

SUMMARY OF THE INVENTION

The present invention provides a method for preparing aquatic animals for edible consumption. In one embodiment, the invention provides a method for processing aquatic animals for edible consumption comprising the steps of placing an aquatic animal while in a living state in a medium comprising trehalose, allowing the live aquatic animal to be exposed to the medium comprising trehalose for a period of time such that trehalose is incorporated in the tissues of the live aquatic animal, and processing the aquatic animal for storage or use for edible consumption. In one embodiment the trehalose medium can further comprise a sugar alcohol, such as maltitol. In one embodiment the method further comprises, prior to placing the live aquatic animal in a medium comprising trehalose removing the live aquatic animal from a habitation medium.

The trehalose can be present in the medium comprising trehalose at varying concentrations, such as 0.1 to 30% (w/w).

In another embodiment, the processing step of the foregoing method comprises the steps of removing the live animal from the medium comprising trehalose and placing the live animal in a medium comprising an acid. In one embodiment, the acid is citric acid. The citric acid can be present at a concentration of 0.1 to 20% (w/w). The aquatic animal can be held in the medium comprising acid for various periods of time, such as 1 to 20 minutes. The aquatic animal can be removed from the medium comprising an acid and further processed in a variety of ways, including, but not limited to, rinsing and/or chilling and/or freezing and/or using the animal for human consumption.

The present invention also provides a method for preparing aquatic organisms for storage by incorporation of trehalose in a live aquatic animal by providing a food portion to the animal comprising trehalose. In one embodiment of this method the concentration of trehalose in the food portion is 0.1 to 10% (w/w). In another embodiment, the food portion further comprises citric acid. The method can also include the step of preparation of the aquatic animal for consumption.

DESCRIPTION OF THE INVENTION

The present invention provides a method for preparing aquatic animals for edible consumption. It is believed that the present method preserves the cellular and intracellular membranes of the aquatic animal so that TMA formation is prevented or inhibited, while preserving the organoleptic features of aquatic animals (such as after thawing). It is believed that the benefits of the present invention are based, at least in part, on the animals being alive while being exposed to the trehalose medium. Because the aquatic animals are alive when incubated in the trehalose solution, it is believed the distribution of the trehalose within tissues occurs faster and more uniformly than if the incubation is done postmortem. Further, by exposing live aquatic animals to trehalose containing medium, it is considered that incorporation of trehalose into the tissues can be achieved with a lower level of trehalose than that used in postmortem exposure. The incorporation of trehalose in the tissues may occur via diffusion or ingestion. The ingestion may be through the gills or via the mouth. This also provides for lower concentration of trehalose in the meat, particularly at its surface, as determined by taste, compared to prior art methods. As a result, unpleasant change of taste (i.e. increased sweetness) is avoided or diminished. Thus, the accumulation of undesirable products from tissue decomposition (including TMA) is avoided and the animals can be frozen without significant accumulation of such products.

Aquatic animals can be obtained from their natural habitation media such as freshwater or saltwater bodies of water or artificially created habitation media including artificial lakes, ponds, tanks, or other enclosed water areas. Aquatic animals which can be processed according to the present invention can be any seafood or freshwater aquatic animal. Suitable aquatic animals include, but are not limited to, fish, shellfish, and crustacea. Examples include, but are not limited to, shrimp, crayfish, crabs, lobsters, eels, mollusks (such as mussels, clams, scallops, and oysters), and cephalopods (such as squid and octopus).

The trehalose medium is prepared by dissolving trehalose (available commercially) in an aqueous medium which is suitable for keeping the aquatic animals alive. In one embodiment, the water from which the aquatic animals are captured or cultivated (including fresh or salt water) can be used to prepare the trehalose medium. The makeup of the freshwater or saltwater is generally known in the art and therefore, such aqueous solutions can also be artificially prepared.

The concentration or trehalose and length of treatment can be selected such that it provides cryoprotection but does not significantly impart a sweet taste. In one embodiment, the trehalose concentration in the solution is within the range of 0.1-30 g per 100 g of solution (0.1 to 30% w/w) (and all integer and tenth of a decimal percentages therebetween). In various embodiments, the concentration of trehalose is 1, 2, 3, 4, 5, 6, 7, 8, 9, 10, 11, 12, 13, 14, 15, 16, 17, 18, 19%, or 20%. In another embodiment, the trehalose concentration is between 1 and 20%. In other embodiments, the trehalose concentration is between 1 and 15 or 1 and 10%. Those skilled in the art will appreciate that variations within the disclosed ranges and times can be made to achieve the desired organoleptic and storage properties while minimizing any undesirable sweetness.

In one embodiment, it is advantageous that the trehalose medium contain sugar alcohols such as maltitol, mannitol and/or lactitol. A suitable concentration of the sugar alcohols in the trehalose medium is from 0.1 to 30% (w/w) (and all integer and tenth of a decimal percentages therebetween). In various embodiments, the concentration of the sugar alcohols in the trehalose medium is 1 to 20%, 1 to 10%, 5 to 15%, 5 to 10%, or 4 to 8%. In one embodiment, other sugars such as other non-reducing sugars are included in the trehalose medium.

In various embodiments, the trehalose medium can optionally contain added salts and/or sodium tripolyphosphate (STP).

The live aquatic animals can be removed from the habitat medium and placed in the trehalose solution for a period of time. In one embodiment, the animals are directly transferred from the habitat medium to the trehalose medium without any intermediate step and with little or no delay. The aquatic animals can remain alive in the trehalose solution. The animals can be placed in the trehalose solution from 1 to 36 hours including all hours and half hours therebetween. In alternative embodiments, the animals can be placed in the trehalose solution for 1, 1.5, 2, 2.5, 3, 3.5, 4, 4.5, 5, 5.5, 6, 6.5, 7, 7.5, 8, 8.5, 9, 9.5 or 10 hours. In one embodiment, it is advantageous that the trehalose solution is aerated (such as by a continuous aeration system). By incubating live aquatic animals in the trehalose solution, it is believed an appropriate and generally uniform concentration of trehalose in tissues and cells can be achieved.

Processing the aquatic animals for storage and/or edible consumption can take a variety of forms. In one embodiment, the aquatic animal may be directly frozen in the trehalose medium. In various other embodiments, the live aquatic animal can be removed from the trehalose medium, optionally rinsed (such as with water), chilled in an ice/brine mixture, packed between layers of ice, or frozen, or any one or combination of the foregoing processes.

For freezing, the aquatic animal is transferred to a freezer. The frozen aquatic animals can be stored at freezer temperature (such as 0° C. or lower). In one embodiment, the aquatic animals are cooled to a temperature of −20° C. Typically, the frozen aquatic animals can be stored in the freezer for at least 1 to 2 years. In the frozen state, the aquatic animals remain preserved during transport (for example transport between a fish farm and the processing plant). Transport of animals can also be carried out while they are alive in the trehalose solution. The aquatic animals can alternatively be kept at refrigeration temperatures, for example 1-5° C.

While not intending to be bound by any particular theory, it is considered that when the trehalose treated animals (e.g. shrimp) are further processed (e.g. cooled and frozen), the trehalose, which has penetrated inside the tissues, prevents ice crystals from growing and protects the cell membranes from destruction. This prevents TMA forming from TMAO and the unpleasant "fish" smell is reduced or absent after thawing.

In one embodiment, the aquatic animals can be transferred from the trehalose medium to an acid containing medium with or without rinsing (such as with water). The acid containing medium lowers the pH of aquatic animals prior to subsequent processing (e.g. freezing). The acid containing medium comprises an acid. The acid is selected from the group consisting of maleic acid, fumaric acid, ascorbic acid, acetic acid, and combinations thereof. In one embodiment, the source of the acid is a natural source of acid selected from the group consisting of lemon juice, vinegar and combinations thereof. A suitable concentration of the acid in the acid containing solution is from 0.1 to 20% (w/w) (and all integers and tenths of a decimal percentages therebetween). In alternative embodiments, the concentration of acid can be such that the aquatic animals are irritated, as evidenced by erratic behavior, or are killed. In various embodiments, the concentration of the acid in the acid containing solution is 0.1 to 15%, 0.1 to 10, 5 to 15%, or 8 to 13%. In one embodiment, the concentration of the acid in the acid containing solution is 11.5%.

In one embodiment, the aquatic animal may be directly frozen in the acid containing medium. In various other embodiments, the live aquatic animal can be removed from the acid containing medium, optionally rinsed (such as with water), chilled in an ice/brine mixture, packed between layers of ice, or frozen, or any one or combination of the foregoing processes.

In another embodiment, instead of placing the live aquatic animals in the trehalose solution, trehalose can be incorporated into the tissue of the living aquatic animals by including it into feed portions consumed by the animals. For example, 0.1 to 10% (w/w) is a suitable concentration of trehalose to be incorporated into the feed for aquatic animals, such as shrimp. When feed portions are added to the habitat medium in which the aquatic animals are being cultivated, it is expected that the animals will consume the feed (and therefore trehalose as well). After a suitable period of feeding, the animals may be removed from the habitat medium and further incubated in a trehalose medium as described above and/or processed directly as described herein. Thus, trehalose can be incorporated into the tissue of live aquatic animals through the gills, through their digestive systems or through the skin.

Any outer covering or shell can be removed from the aquatic animals after the animals are removed from the water medium and allowed to die. Thus, if the aquatic animal is shrimp, they can be peeled and deveined before being frozen. In another embodiment, the outer covering or shell can be removed after the animals are thawed. For example, frozen shrimp can be thawed and can be held in cold water (0-10° C.) for a period of time (such as 1 minute to 2 hours), if desired. The indicated time should be sufficient for washing the excess trehalose from the surface of the meat without causing any significant changes to the structure and organoleptic properties of the meat.

The following example is presented to illustrate the invention and is not intended to be restrictive in any manner.

EXAMPLE 1

This example compares the results of shrimp samples processed under four test conditions.

Tests 1A & B

Control: Samples were prepared using current commercial shrimp processing processes. Shrimp were removed from a pond by cast net and immediately submerged in slush (ice bath). They were then drained after 15 minutes, iced down and then transferred to a processing plant where they were headed, peeled and deveined, and iced. After this, the samples were either not treated with any solution (Test 1A) or were treated with Treatment Solution 1 (static soak for 90 minutes) (Test 1B).

| Treatment Solution 1 | % (w/w) |
| --- | --- |
| Water | 94.00 |
| STP (sodium tripolyphosphate) | 4.00 |
| Salt | 2.00 |

Test 2

In this test, shrimp were removed from a pond with cast net and immediately submerged in slush (ice bath). They were then drained after 15 minutes and iced down. They were then transferred to a processing plant, headed, peeled and deveined, and iced. Shrimp were then treated with Treatment Solution 2 (static soak for 90 minutes).

| Treatment Solution 2 | % (w/w) |
| --- | --- |
| Water | 73.80 |
| STP | 4.00 |
| Salt | 2.00 |
| Trehalose (powder) | 10.00 |
| Maltitol (powder) | 10.00 |
| Citric Acid (granular) | 0.20 |

Test 3

In this test, live shrimp were added to the trehalose/maltitol/citric acid solution (Live Treatment Solution 1). The shrimp were removed from a pond by cast net, weighed and immediately transferred to a bin and submerged alive in a continuously aerated bin containing Live Treatment solution 1.

| Live Treatment Solution 1 | % (w/w) |
| --- | --- |
| Pond water | 86.92 |
| Trehalose (powder) | 5.89 |
| Maltitol (powder) | 5.89 |
| Citric acid (granular) | 1.30 |

The shrimp remained alive and very active for 20-25 minutes. A white patch began to appear at the base of head. Live shrimp were added to solution in batches as caught (about 10 lbs at a time). Shrimp first added to solution remained submerged for up to 2 hours even after death. After death, shrimp were drained, weighed, iced down. They were then transferred to plant, headed, peeled and deveined, and iced. In test 3A, the shrimp were not further treated with solution and in Test 3B, shrimp were then soaked in Treatment Solution 1 for 90 minutes.

| Treatment Solution 1 | % (w/w) |
| --- | --- |
| Water | 94.00 |
| STP | 4.00 |
| Salt | 2.00 |

Test 4

This test describes the addition of live shrimp to 2 different solutions: Live Treatment Solution 2 (trehalose/maltitol solution) and Live Treatment Solution 3 (citric acid solution). Shrimp pulled from pond by cast net were weighed and immediately transferred and submerged in a continuously aerated bin of Live Treatment Solution 2.

| Live Treatment Solution 2 | % (w/w) |
| --- | --- |
| Water (pond) | 86.72 |
| Trehalose (powder) | 6.64 |
| Maltitol (powder) | 6.64 |

Shrimp were alive and very active for 2½ hours. The oxygen aeration tanks became depleted and shrimp began to struggle for air. Again accumulation of white matter in the form of a visible patch at the base of the head of the shrimp occurred during submersion in Live Treatment Solution 2. The shrimp were drained and transferred to another bin with Live Treatment Solution 3.

| Live Treatment Solution 3 | % (w/w) |
| --- | --- |
| Water (pond) | 88.50 |
| Citric Acid (Granular) | 11.50 |

Death of shrimp occurred within 6-8 minutes in Live Treatment solution 3. After death the shrimp were removed, drained and dipped in clean slush ice to rinse. The shrimp were iced down and transferred to plant.

In Test 4A, shrimp were not further treated with solution and in Test 4B, shrimp were then soaked in Treatment Solution 1 for 90 minutes.

| Treatment Solution 1 | % (w/w) |
| --- | --- |
| Water | 94.00 |
| STP | 4.00 |
| Salt | 2.00 |

Shrimp from all tests were processed with treatment procedures outlined above then placed in 6 oz pouches, cooked, chilled and frozen

RESULTS

Prior to evaluation of cooked shrimp, all sample pouches were allowed to thaw then stored under refrigerated conditions for 21 days before evaluation. Samples were evaluated for presence of TMA by a Sensory Panel using a 9 point scale. The results are shown in table 1

TABLE 1

Results of sensory evaluation of TMA odor produced by different treatment protocols on live and dead shrimp

| Test Sample | TMA Odor (1 = low, 9 = high) |
| --- | --- |
| 1A | 7 |
| 1B | 7 |
| 2 | 5 |
| 3A | 3 |
| 3B | 2 |
| 4A | 2.5 |
| 4B | 1.5 |

General Evaluation

| Sample | Texture | Flavor | Purge | Odor |
| --- | --- | --- | --- | --- |
| 1A | Tough and mealy | Flavorless | Milky, cloudy, pink tint w/ much coagulated protein | Strong TMA odor |
| 1B | Slightly soft | Salt Perceived, no sweetness | Lightest color of all tests, slightly cloudy - all other STP treated tests much clearer | Strong TMA odor |
| 2 | Much firmer than test 1B | Marked sweetness | Slightly cloudy but darker pink than 1A | Some TMA but not as strong as Test 1A and 1B |
| 3A | Tougher than 1A and 4A | Slight sweetness | Milky, cloudy, much coagulated protein | Reduced from test 2 |
| 3B | Firmer than 2 and 4B, good | Slightly sweet, not as sweet as 2 | Darkest pink shade of all samples | Very slight TMA odor - clean/fresh (citrus) note |
| 4A | Tough | Slight sweetness | Milky, cloudy, much coagulated protein | Very similar to 3A |
| 4B | Not as firm as 3B but very good | Slightly sweeter than 3B | Slight pink similar to control 1B | Lowest level of TMA odor. Not as clean as 3B |

These data indicate that testing using trehalose, maltitol and citric acid in solution(s) on live shrimp as a treatment to reduce the presence of TMA in cooked and refrigerated shrimp was successful. Improved results came from live shrimp that were first submerged in a concentrated solution of trehalose and maltitol, alive and active for 2½ hours and then transferred into a citric solution where death ensued after 10 minutes. Testing indicates bringing live shrimp into contact with the solution for a period of time before death inhibits the formation of TMA after death and subsequent decomposition.

We claim:

1. A method for processing aquatic animals for edible consumption comprising:
   i. placing an aquatic animal while in a living state in a medium comprising trehalose at a concentration of 0.1 to 30% (w/w);
   ii. allowing the live aquatic animal to be exposed to the medium comprising trehalose for a period of time such that trehalose is incorporated in the tissues of the live aquatic animal; and
   iii. processing the aquatic animal with or without storage for edible consumption by humans.

2. The method of claim 1, wherein prior to placing the live aquatic animal in a medium comprising trehalose, the live aquatic animal is removed from a habitation medium.

3. The method of claim 2, wherein the habitation medium is selected from the group consisting of natural habitation medium and artificial habitation medium.

4. The method of claim 2, wherein the habitation medium is sea water or fresh water.

5. The method of claim 1, wherein the trehalose is present in the medium at a concentration of 1 to 10% (w/w).

6. The method of claim 5, wherein the trehalose is present in the medium at a concentration of 2 to 9% (w/w).

7. The method of claim 1, wherein the medium comprising trehalose also comprises a sugar alcohol at a concentration of 1 to 10%.

8. The method of claim 7, wherein the sugar alcohol is selected from the group consisting of maltitol, mannitol, and lactitol.

9. The method of claim 1, wherein processing in step iii) comprises removing the live aquatic animal from the medium comprising trehalose and placing the live aquatic animal in a medium comprising an acid at a concentration of 0.1 to 20% (w/w), removing the aquatic animal from the medium comprising the acid and processing the aquatic animal for edible consumption by humans with or without storage.

10. The method of claim 9, wherein the acid is selected from the group consisting of maleic acid, fumaric acid, ascorbic acid, acetic acid, and combinations thereof.

11. The method of claim 10, wherein the acid is present at a concentration of 11.5%.

12. The method of claim 1, wherein the living aquatic animal is exposed to the medium comprising trehalose for 1 to 36 hours.

13. The method of claim 12, wherein the living aquatic animal is exposed to the trehalose medium for 1, 1.5, 2, 2.5, 3, 3.5, 4, 4.5, 5, 5.5, 6, 6.5, 7, 7.5, 8, 8.5, 9, 9.5 or 10 hours.

14. The method of claim 1, wherein the aquatic animal is selected from the group consisting of fish, shellfish, and crustacea.

15. The method of claim 1, wherein the aquatic animal is selected from the group consisting of shrimp, crayfish, crabs, lobsters, eels, mussels, clams, scallops, oysters, squid, and octopus.

16. A method for preparing an aquatic animal for storage comprising:
a) incorporating trehalose into the tissues of the aquatic animal while the aquatic animal is alive by placing an aquatic animal while in a living state in a medium comprising trehalose at a concentration of 0.1 to 30% (w/w);
b). allowing the live aquatic animal to be exposed to the medium comprising trehalose for a period of time such that trehalose is incorporated in the tissues of the live aquatic animal and;
freezing the aquatic animal;
wherein upon thawing of the aquatic animal, unpleasant odor due to trimethylamine (TMA) is reduced relative to an aquatic animal that does not have trehalose incorporated therein.

17. The method of claim 16, wherein the incorporating is carried out by feeding the aquatic animal a feed portion comprising trehalose.

18. The method of claim 17, wherein the feed portion further comprises citric acid.

19. The method of claim 16, wherein the medium comprising trehalose also comprises a sugar alcohol at a concentration of 1 to 10%.

20. The method of claim 16, further comprising the step of placing the aquatic animal in a medium containing an acid at a concentration of 0.1 to 20% (w/w) prior to the step of freezing.

21. The method of claim 16, wherein the medium comprising trehalose includes one or more compounds selected from the group consisting of salts and sodium tripolyphosphate.

* * * * *